(12) United States Patent
Heuthe et al.

(10) Patent No.: US 7,352,408 B2
(45) Date of Patent: Apr. 1, 2008

(54) SUPPRESSION OF MULTIPATH EFFECTS IN THE TRANSMISSION OF ANALOG TV SIGNALS

(75) Inventors: Ronald Heuthe, Neckarwestheim (DE); Karl Strohm, Ulm (DE); Thomas Mueller, Ulm (DE); Tobias Kiefer, Michelstadt (DE); Marcus Windisch, Dresden (DE)

(73) Assignee: DaimlerChrysler AG, Stuttgart, DE (US)

( * ) Notice: Subject to any disclaimer, the term of this patent is extended or adjusted under 35 U.S.C. 154(b) by 546 days.

(21) Appl. No.: 11/051,233

(22) Filed: Feb. 4, 2005

(65) Prior Publication Data

US 2005/0219419 A1 Oct. 6, 2005

(30) Foreign Application Priority Data

Feb. 6, 2004 (DE) ............... 10 2004 006 110
Apr. 1, 2004 (DE) ............... 10 2004 016 192

(51) Int. Cl.
*H04N 5/21* (2006.01)
(52) U.S. Cl. .................................. 348/614
(58) Field of Classification Search ............ 348/614, 348/607, 611, 725, 726; 375/232, 327
See application file for complete search history.

(56) References Cited

U.S. PATENT DOCUMENTS

| 4,703,357 | A |  | 10/1987 | Ng et al. ............ 358/166 |
|---|---|---|---|---|
| 4,870,480 | A |  | 9/1989 | Chao ............ 358/23 |
| 5,196,936 | A | * | 3/1993 | Kobayashi et al. ...... 348/614 |
| 5,600,380 | A | * | 2/1997 | Patel et al. ............ 348/614 |
| 5,623,319 | A | * | 4/1997 | Hill et al. ............ 348/614 |
| 6,184,938 | B1 | * | 2/2001 | Patel et al. ............ 348/614 |
| 6,289,048 | B1 | * | 9/2001 | Richards et al. ........ 375/235 |
| 6,295,325 | B1 | * | 9/2001 | Farrow et al. .......... 375/327 |
| 6,975,689 | B1 | * | 12/2005 | McDonald et al. ...... 375/316 |
| 7,151,797 | B2 | * | 12/2006 | Limberg ............... 375/232 |
| 7,215,939 | B2 | * | 5/2007 | Muterspaugh ......... 455/296 |

FOREIGN PATENT DOCUMENTS

DE        36 87 164 T3      3/1999
EP        0 228 880         8/1998

\* cited by examiner

*Primary Examiner*—Paulos M. Natnael
(74) *Attorney, Agent, or Firm*—Davidson, Davidson & Kappel, LLC

(57) ABSTRACT

A method for compensating for multipath effects when receiving a vestigial sideband modulated TV signal, one portion of the spectrum of the undistorted TV signal being symmetrical with respect to a video carrier frequency, and deviations from the symmetry of the relevant portion of the spectrum that exists in the undistorted state being analyzed in order to suppress the multipath effects.

3 Claims, 1 Drawing Sheet

SUPPRESSION OF MULTIPATH EFFECTS IN THE TRANSMISSION OF ANALOG TV SIGNALS

Priority is claimed to German Patent Application Nos. DE 10 2004 006110.6, filed on Feb. 6, 2004 and DE 10 2004 016192.5-31, filed on Apr. 1, 2004, both of which are incorporated by reference herein.

The present invention is directed to a method for suppressing multipath effects in the transmission of analog TV signals.

BACKGROUND

In comparison with modem day digital methods, a number of disadvantages are associated with conventional analog TV transmission. Mention is made here, in particular, of the fact that analog transmission is highly susceptible to interference. The extent of the interference effects ranges from shadowing, distortions and partial image drop-outs, to total image drop-outs. Multipath propagation effects, in particular, contribute to this interference.

This so-called multipath propagation stems for the most part from a specific signal component reaching the receiver via a direct path, while other signal components, due, for example, to reflections off of specific terrain features, such as steeply rising mountain slopes, reach the receiver via an indirect path and thus, with a slight delay as compared to the directly received signal. The superposition of these two signals results in a clearly degraded reception and, respectively, reproduction quality.

In a vehicle that is underway, the effects of multipath propagation are even greater due to the constantly changing topography of the surroundings. Thus, an incoming signal in an urban area behaves completely differently than in a rural area. In the city, the differences in the signal propagation times are substantially smaller than in rural or mountainous environments. This can mostly be attributed to the fact that, in the city, the signal is reflected off of neighboring buildings, whereas, in rural surroundings, the signal is more likely to be reflected off of distant mountains.

Thus, the need exists to find ways to reduce or even to eliminate such interference. To this end, in recent years, advances in technology are making new approaches possible. Thus, in the meantime, it has become possible to sample broadband analog signals, such as the TV signal, for example, in order to subsequently further process it digitally. This had not been possible under known methods heretofore due to the low computing power of the commonly used semiconductor components.

A plurality of approaches are known under the related art for this type of further processing for suppressing multipath propagations. In the special case of the analog TV, it is conceivable, for example, to use the line synchronization signal in order to make use of a channel estimation for purposes of signal correction. This can be undertaken, for example, by using filters whose characteristic is the inverse of the impulse response for purposes of signal correction. In this context, however, the filter regularly experiences stability problems, so that this approach does not appear to be very promising.

In addition, a method is presented in the German Patent DE 36 87 164 T3, which provides for the filter coefficients of a digital filter to be calculated exclusively by using correlation operations to compensate for multipath propagation.

However, the method described in the mentioned publication does not require that a reference value be obtained from a signal that is, in particular, not distorted (i.e., not interfered or noise-corrupted) by multipath propagations.

Moreover, the optimization can only be accomplished on the basis of the synchronization pulses which are not continuously present in the signal, so that the quality of the signal conditioning is substantially degraded.

SUMMARY OF THE INVENTION

Thus, an object of the present invention is to provide a rugged, reliable and effective method for suppressing multipath propagations in analog TV transmissions.

The present invention provides a method for compensating for multipath effects when receiving a vestigial sideband modulated TV signal, one portion of the spectrum of the undistorted TV signal being symmetrical with respect to a video carrier frequency, wherein deviations from the symmetry of the relevant portion of the spectrum that exists in the undistorted state are analyzed in order to suppress the multipath effects. Advantageous variants and refinements of the present invention are described in the specification and in the claims.

BRIEF DESCRIPTION OF THE DRAWINGS

The present invention is described in more detail below with reference to the drawings, in which.

Figure 1:
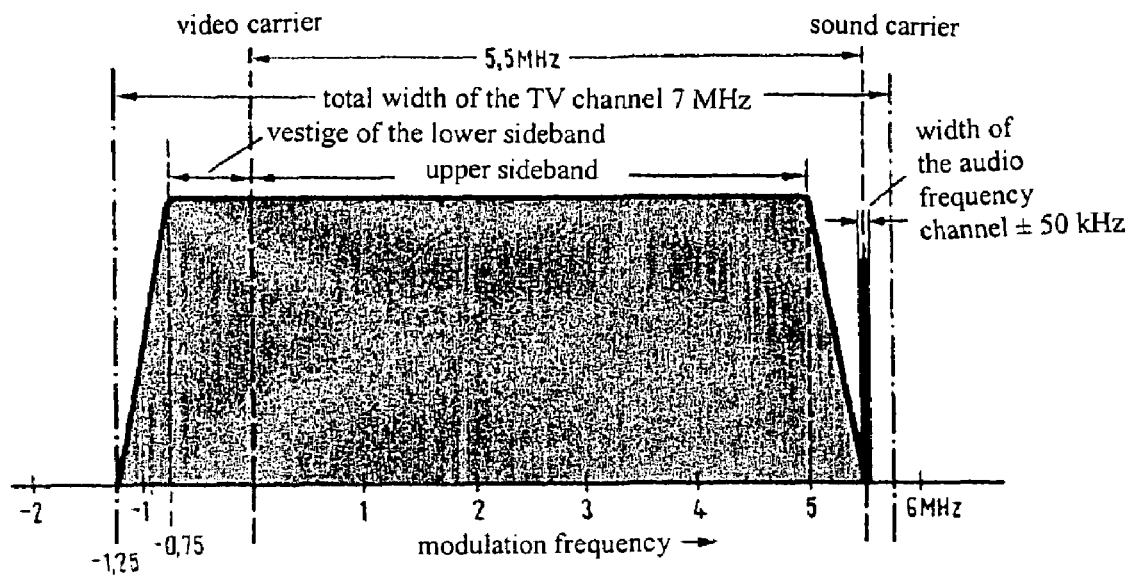
FIG. 1 shows the spectrum of a TV signal.

The method according to the present invention for compensating for multipath effects essentially provides for utilizing the symmetry of one portion of the spectrum of the undistorted TV signal with respect to the video carrier frequency. An analog TV signal having a bandwidth of approximately 7-8 MHz is broadcast terrestrially. The type of modulation used is vestigial sideband modulation. A special characteristic of this type of modulation is that an approximately 1 MHz wide component of the TV signal is broadcast redundantly as a so-called vestigial sideband below the video carrier frequency. To illustrate this, the spectrum of a TV signal is shown in FIG. 1.

Since only one sideband is needed to retrieve video information using existing means, the vestigial sideband may be used for correction purposes. The method of the present invention provides that the sampled signal be checked for any existing spectral asymmetry in the redundant frequency range. The deviations from symmetry may be used to eliminate the distortion of the TV signal.

One particularly advantageous variant of the method according to the present invention provides for the multipath effects to be suppressed by minimizing the imaginary component of the complex TV signal.

If a signal is broadcast without distortion and periodically sampled, then this signal is symmetrical in its spectrum and may be described by a real function. If the signal was interfered in transit by noise, then deviations in its symmetry result, so that it is only possible to describe the signal using a complex function.

Thus, the distortions arising, in particular, from multipath propagations may be suppressed, in particular, in that the distorted signal is processed in a way that minimizes the imaginary components in proportion to the real components of the complex TV signal.

Digital filters are advantageously used for processing the distorted signal. They are commercially available in a great variety of forms and, with respect to their properties, are able to be superbly matched to the particular field of application.

In this context, the present invention provides for the digital filter to be used in such a way that the filter coefficients are determined from the deviations in the TV signal from the symmetry in the baseband, and for the signal to be subsequently further processed using the new filter coefficients. In the process, the so-called block-by-block adaptation is used, i.e., after a certain number of cycles, new filter coefficients are calculated.

As already mentioned above, in the case of real signals, the upper and lower sidebands are symmetrical. This property is utilized by the method according to the present invention to optimize the filter. In this context, the complex filter coefficients of the digital filter are modified in such a way that the imaginary component of the resulting baseband signal disappears to the greatest degree possible.

Thus, multipath propagation effects and the Doppler effect may be reduced. The picture becomes sharper. Improvements in the picture quality are effected by the method according to the present invention in a motor vehicle that is underway or in mobile applications, in particular.

Figure 2:
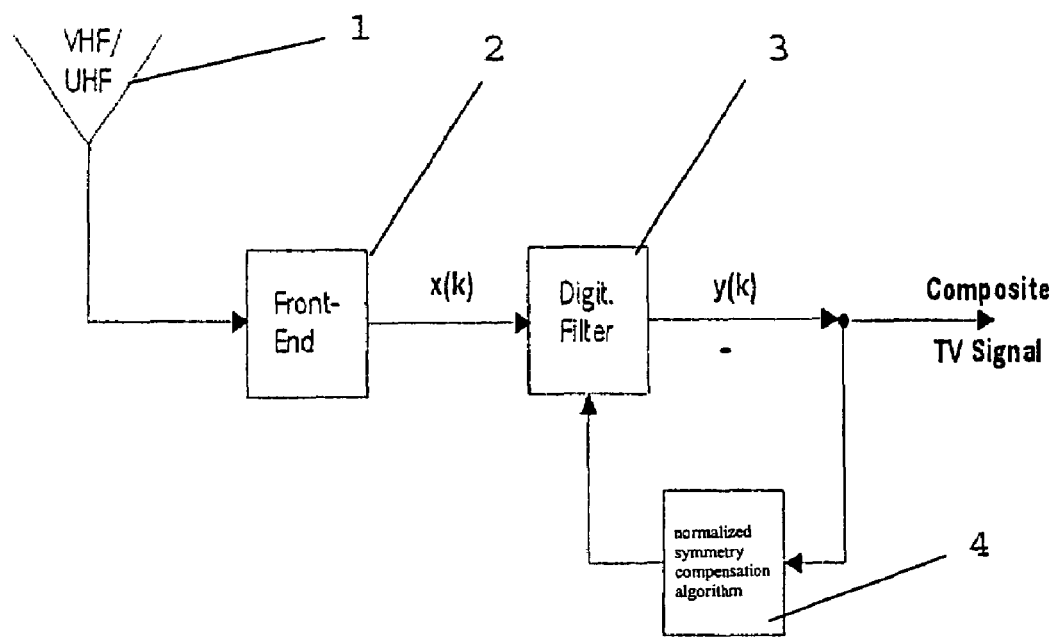
FIG. 2 shows a schematic view of the method according to the present invention.

As shown in FIG. 2, the signal is fed via an antenna 1 to a front end 2, where it is amplified, filtered and down-converted into the complex baseband. From there, the TV signal that is received as a distorted, sampled signal and that is located in the complex baseband, arrives at subsequent digital filter 3. The employed coefficient number of digital filter 3 is denoted by $N_W$ and amounts, for example, to 20. Since block-by-block adaptation is carried out, in each instance, $N_H$ samples of the TV signal are transmitted serially into digital filter 3. The coefficients of digital filter 3 are determined from the output signal of digital filter 3 using a normalized symmetry compensation algorithm 4 (NSCA).

Thus, an important objective of the method according to the present invention is the calculation of complex filter coefficients.

This essentially includes the following steps:
Error function e(k)

$$e(k) = \alpha \cdot \sum_{k}^{N_H} \arctan(\operatorname{imag}(y(k))/\operatorname{real}(y(k)))$$

first identifies the occurring errors in symmetry from complex filtered signal y(k). In this connection, a is a scalar quantity and may be assumed to be 0.5, for example. The relative imaginary component of the signal defines error function e(k). Therefore, the objective is to minimize e(k) and thus to generate signal y(k) to the extent that is possible purely as a real-valued signal.

In a next step, the coefficients of the filter must be calculated from these error values. This requires the following individual steps:
The calculation of the gradient $$\nabla_{w(k-i)} e(k) = \frac{-j}{y(k-i)} \begin{bmatrix} x(k-i) \\ x(k-i-1) \\ \vdots \\ x(k-i-N_w+1) \end{bmatrix}$$

precedes the calculation of the update direction $$\Delta w(k) = \sum_{i=0}^{N_H} \nabla_{w(k-i)} \cdot e(k)$$

as superposition of the gradients.

At this point, to obtain a normalized step size when adapting the coefficients, $$\Delta e(k) = \sum_{i=0}^{N_H} \operatorname{Re}\{\Delta w^H(k) \nabla_{w(k-i)} \cdot e(k)\}$$

is calculated. Superscript H is the Hilbert transform used.
Equation $$w(k+1) = w(k) - \mu \frac{e(k)}{\Delta e(k)} \Delta w(k)$$

may now be used to calculate the new distortion correction vector. μ is used in this case for controlling the step size and is one, for example.

The new values y(k) may now be subsequently calculated using the computed filter coefficients.

One advantageous alternative for dynamically calculating the filter coefficients provides for using a type of look-up table, in which a multiplicity of complex signal values y(k) are assigned filter coefficients of the digital filter, and the filter coefficients are selected on the basis of a comparison of the measured values for y(k) with the values for y(k) stored in the table. In this context, the complex signal values and the corresponding filter coefficients may be advantageously determined by simulating possible signal shapes and subsequently calculating the filter coefficients using the method described above. The particular benefit of this procedure is that the analysis of the distorted signal is limited merely to a comparison with already stored values, so that the requisite computational time is clearly reduced.

Thus, the method presented renders possible a flexible and efficient suppression of multipath propagation, particularly for mobile analog TV receivers.

What is claimed is:
1. A method for compensating for multipath effects of a vestigial sideband modulated TV signal, a portion of a spectrum of the undistorted TV signal being symmetrical with respect to a video carrier frequency, the method comprising:
receiving the vestigial sideband modulated TV signal; and
analyzing deviations from symmetry of a relevant portion of the spectrum that exists in the undistorted state so as to suppress the multipath effects,
wherein the TV signal includes an imaginary component and a real component and further comprising minimizing the imaginary component in proportion to the real component in the baseband so as to suppress the multipath effects,
wherein the minimizing is performed using a digital filter, and further comprising determining filter coefficients using a stochastic gradient method including the following steps:
defining an error function e(k) from the filtered signal y(k)
calculating the gradient of the error function e(k)

superposing the gradient of the error function
defining a step size for adapting the filter coefficients
defining the filter coefficients of the digital filter as components of a distortion correction vector and
calculating the new filtered TV signal using the distortion correction vector.

2. The method as recited in claim 1, wherein the error function e(k) has the form $$e(k) = \alpha \cdot \sum_{k}^{N_H} \arctan(\operatorname{imag}(y(k))/\operatorname{real}(y(k)))$$

and the distortion correction vector is calculated using the expression $$w(k+1) = w(k) - \mu \frac{e(k)}{\Delta e(k)} \Delta w(k).$$

3. The method as recited in claim 1, wherein the error function e(k) has the form $$e(k) = \alpha \cdot \sum_{k}^{N_H} b(k) \cdot \arctan(\operatorname{imag}(y(k))/\operatorname{real}(y(k)))$$

where $b(k) = \dfrac{|y(k)|}{\sum_{k}^{N_H} |y(k)|}$ and the distortion correction vector is calculated using the expression $$w(k+1) = w(k) - \mu \frac{e(k)}{\Delta e(k)} \Delta w(k).$$

* * * * *

UNITED STATES PATENT AND TRADEMARK OFFICE
CERTIFICATE OF CORRECTION

| | | |
|---|---|---|
| PATENT NO. | : 7,352,408 B2 | Page 1 of 1 |
| APPLICATION NO. | : 11/051233 | |
| DATED | : April 1, 2008 | |
| INVENTOR(S) | : Ronald Heuthe et al. | |

It is certified that error appears in the above-identified patent and that said Letters Patent is hereby corrected as shown below:

(Col. 1, Line 15) should read --In comparison with modern day digital methods, a num- -- INSTEAD OF "In comparison with modem day digital methods, a num-"

(Col. 3, Line 49) should read --In this connection, $\alpha$ is a scalar quantity and may be assumed to be 0.5, for example."-- INSTEAD OF "In this connections, a is a scalar quantity and may be assumes to be 0.5, for example."

Signed and Sealed this

Twenty-ninth Day of July, 2008

JON W. DUDAS
*Director of the United States Patent and Trademark Office*